(12) United States Patent
Russel-Smith

(10) Patent No.: US 7,694,901 B2
(45) Date of Patent: Apr. 13, 2010

(54) DENSIFYING OF A BULK PARTICULATE MATERIAL

(76) Inventor: Kevan Vaughan Russel-Smith, 28 Gemini Street, Sundowner, 2161 Johannesburg (ZA)

( * ) Notice: Subject to any disclaimer, the term of this patent is extended or adjusted under 35 U.S.C. 154(b) by 386 days.

(21) Appl. No.: 10/554,474

(22) PCT Filed: Apr. 23, 2004

(86) PCT No.: PCT/IB2004/050504

§ 371 (c)(1),
(2), (4) Date: Aug. 31, 2006

(87) PCT Pub. No.: WO2004/094056

PCT Pub. Date: Nov. 4, 2004

(65) Prior Publication Data

US 2007/0176032 A1    Aug. 2, 2007

(30) Foreign Application Priority Data

Apr. 23, 2003  (ZA) ..................................... 03/3133

(51) Int. Cl.
*B02C 19/00* (2006.01)
(52) U.S. Cl. ............................ 241/21; 241/30; 241/277
(58) Field of Classification Search ................. 241/187, 241/188.1, 189.1, 277, 154, 605, 165.5, 21, 241/30, 199.12, 282.1, 282.2
See application file for complete search history.

(56) References Cited

U.S. PATENT DOCUMENTS

| | | | | |
|---|---|---|---|---|
| 2,230,880 A | * | 2/1941 | Brown | 425/83.1 |
| 2,828,191 A | | 3/1958 | Glaxner et al. | 23/314 |
| 2,924,847 A | | 2/1960 | Keiding et al. | 18/1 |
| 3,049,750 A | | 8/1962 | Austin | 18/1 |
| 3,730,663 A | | 5/1973 | Hare | 425/222 |
| 5,947,396 A | | 9/1999 | Pierce | 241/32 |
| 6,669,125 B1 | * | 12/2003 | Howard | 241/187 |

FOREIGN PATENT DOCUMENTS

| | | |
|---|---|---|
| DE | 17 67 784 A | 4/1972 |
| FR | 2 147 552 A | 3/1973 |
| WO | WO 03/018201 A | 3/2003 |

* cited by examiner

*Primary Examiner*—Mark Rosenbaum
(74) *Attorney, Agent, or Firm*—Wood Herron & Evans, LLP

(57) ABSTRACT

A method of densifying a bulk particulate material includes at least partially confining the bulk particulate material, and mechanically agitating the confined bulk particulate material with at least two elongate rotatable members (14), (15) of which at least one is submerged in the confined bulk particulate material. The rotatable members each have an axis of rotation and include a plurality of axially spaced agitating formations (40) which project outwardly away from their axes of rotation. The rotatable members are transversely spaced.

13 Claims, 5 Drawing Sheets

DENSIFYING OF A BULK PARTICULATE MATERIAL

THIS INVENTION relates to densifying of a bulk particulate material. In particular, it relates to a method and to apparatus for densifying a bulk particulate material.

According to one aspect of the invention, there is provided a method of densifying a bulk particulate material, the method including at least partially confining the bulk particulate material; and mechanically agitating the confined bulk particulate material with at least two elongate rotatable members of which at least one is submerged in the confined bulk particulate material, the rotatable members each having an axis of rotation and including a plurality of axially spaced agitating formations which project outwardly away from their axes of rotation, and the rotatable members being transversely spaced, thereby to densify the bulk particulate material.

The action of the submerged rotatable member or members and the agitating formations is thus not to compress the bulk particulate material, but mechanically severely to agitate the confined bulk particulate material, during agitation thoroughly mixing the bulk particulate material, without significantly fluidising the bulk particulate material and without causing any stable cavities in the bulk particulate material.

Typically, each rotatable member is submerged in the confined bulk particulate material. In other words, there is typically a head of bulk particulate material above all of the rotatable members.

The method may include feeding the bulk particulate material being densified in a direction which is transverse to the axes of rotation of the rotatable members, past the rotatable members.

Preferably, at least two of the elongate rotatable members are arranged one above the other. When at least two rotatable members are arranged one above the other, they may be rotated in the same direction.

Preferably, at least two of the elongate rotatable members are arranged side by side. When at least two rotatable members are arranged side by side, they may be rotated in opposite directions.

A vertical bulk density gradient may be established in the confined bulk particulate material, with the highest bulk density being at the bottom.

The bulk particulate material may be at least partially confined in a manner which leaves a free head space above the confined bulk particulate material, with the agitated bulk particulate material being allowed to take up at least some of the free head space during agitation.

The axes of rotation of the rotatable members are typically substantially parallel. The axes of rotation preferably extend sideways, e.g. substantially horizontal. It is however within the scope of the invention for the axes of rotation to extend upwardly, e.g. vertically.

The bulk particulate material may be at least partially confined in a vessel.

The rotatable members may be rotated such that a point on an extreme radially outer periphery of a rotatable member, submerged in the bulk particulate material, travels at a speed of between about 3 m/s and about 100 m/s, typically between about 20 m/s and about 23 m/s.

Confining the bulk particulate material may include feeding the bulk particulate material into the vessel. Thus, an entire body of bulk particulate material may be densified inside the vessel to provide a uniform body of particulate material having a uniform bulk density inside the vessel.

The method may include vibrating the vessel to inhibit agglomeration or build-up or caking of the particulate material against interior surfaces of the vessel.

The method may include discharging the flowable densified bulk particulate material from the vessel. It is to be appreciated that the method can be conducted on a continuous basis or on a batch basis, discharging of the densified bulk particulate material from the vessel and feeding of bulk particulate material into the vessel thus occurring batch-wise, or on a controlled basis. Thus, the bulk particulate material may be fed on a continuous basis into the vessel, and the densified bulk particulate material may be discharged on a continuous basis from the vessel, the entire body of bulk particulate material inside the vessel having, at steady state conditions, a substantially higher average bulk density than bulk particulate material feed.

In one embodiment of the invention, a bulk particulate feed material is densified on a continuous basis, with the bulk particulate feed material being fed from above the rotatable members and with densified bulk particulate material being removed from below the rotatable members.

The method may include measuring or determining the bulk density of the densified bulk particulate material prior to discharging it from the vessel. Instead, the method may include measuring or determining the bulk density of the densified bulk particulate material after it has been discharged from the vessel, or during agitation of the bulk particulate material, e.g. by measuring the current drawn by an electric motor or motors used to rotate the rotatable members.

The rotatable members may be rotated at an angular speed of between 100 rpm and 3500 rpm. Preferably, the rotatable members are rotated at an angular speed of between 500 rpm and 1000 rpm. Typically, the rotatable members are rotated at an angular speed of between 700 rpm and 800 rpm, e.g. about 732 rpm.

The bulk particulate material, prior to densification, may have a mean particle size of less than 1 mm. Typically, the bulk particulate material has a mean particle size of less than 0.5 mm, even less than 1 μm, e.g. about 0.15 μm.

The method may include extracting dust from the vessel.

The ratio of the bulk density of the particulate material prior to densifying thereof, to the bulk density of the flowable densified particulate material may be at least 2:3. Preferably, the ratio of the bulk density of the particulate material prior to densifying thereof, to the bulk density of the flowable densified particulate material is at least 1:5, depending on the bulk density of the particulate material prior to densifying and the particulate material being densified. The ratio can be as large as 1:10, or even larger, e.g. 1:12 depending on the bulk density of the particulate material prior to densifying and the particulate material being densified.

The mechanical agitation of the bulk particulate material may be effected in the presence of a densification agent. The densification agent will be present in quantities small enough to ensure that the densified bulk particulate material remains flowable and essentially dry, and therefore does not form a dough, paste, slurry or the like.

The densification agent may be a polar liquid. In a preferred embodiment of the invention, the densification agent is an aqueous fluid, e.g. water or demineralised water.

When the densification agent is an aqueous fluid, the bulk particulate material, prior to or during densifying thereof, may include water in a mass concentration falling in a range with a lower limit of about 0.5%. The lower limit may however be as low as about 0.45%, or even as low as about 0.4%. An upper limit of the range may be as high as about 10%, or even higher at about 15%, or even as high as about 20%.

It is however to be appreciated that the bulk particulate material being densified may affect the effective range within which an aqueous densification agent can be used. The aforementioned ranges are however suitable for the densification of microsilica, such as silica fume.

The bulk particulate material may be a hygroscopic material. The bulk particulate material may be microsilica, e.g. fumed silica, precipitated silica, colloidal silica or silica gel.

Instead, the bulk particulate material may be selected from the group consisting of carbon black, coal, fly ash, kaolin, and meta kaolin. Also, the bulk particulate material may be selected from the group consisting of $Mn_2O_3$, $Mn_3O_4$, $V_2O_5$, alumina, bauxite, cement and slag.

When the bulk particulate material is particulate silica, the particulate silica may have a particle size of the less than 0.5 µm, typically less than 0.2 µm. Indeed, it is expected that the invention will find particular, though not exclusive application in densifying so-called silica fume.

The method may include adding the densification agent to the bulk particulate material, prior to or during mechanical agitation of the bulk particulate material.

The method may include allowing the concentration of the densification agent to reduce during or after the mechanical agitation of the bulk particulate material. Thus, an average concentration of the densification agent in the densified bulk particulate material may be less than the average concentration of the densification agent in the bulk particulate material being densified.

The method may include allowing bulk particulate material to heat up during the mechanical agitation, with at least a portion of the densification agent vaporizing and being removed from the bulk particulate material being densified or from the densified bulk particulate material.

In one embodiment of the invention, when the densification agent is an aqueous liquid, the bulk particulate material may include water in, or water may be added to the bulk particulate material to, a concentration of more than 4% by mass e.g. 4% to 8% by mass, with the densified bulk particulate material including less than 3% water by mass. In another embodiment of the invention, when the bulk particulate material is microsilica and the densification agent is an aqueous liquid, the microsilica includes water in, or water is being added to the microsilica to, a concentration of between 4% and 8% by mass, e.g. between 6% and 8% by mass, with the densified microsilica including less than 1.5%, preferably less than 1%, water by mass. The Applicant has also found that, when the bulk particulate material is microsilica, excellent results are obtained when the microsilica being densified includes about 1.5% moisture, with the densified microsilica being substantially dry with a moisture content of almost 0%.

The method may include controlling the density of the densified bulk particulate material. The controlling of the density of the densified bulk particulate material may be effected by a method selected from the group consisting of manipulating the residence time of the bulk particulate material in the vessel, manipulating the angular speed of rotation of the rotatable members, manipulating the level of the bulk particulate material in the vessel, controlling the concentration of the densification agent present with the bulk particulate material, and two or more of these methods. The controlling of the density of the densified bulk particulate material is however not necessarily limited to these methods.

The invention extends to a method of densifying a bulk particulate material which includes feeding the bulk particulate material into a densification zone;

at least partially confining the bulk particulate material in the densification zone; and mechanically agitating the confined bulk particulate material with at least one elongate rotatable member submerged in the confined bulk particulate material, the rotatable member having an axis of rotation and including a plurality of axially spaced agitating formations which project outwardly away from the axis of rotation, the bulk particulate material being fed through the densification zone in a direction which is transverse to the axis of rotation of the rotatable member.

According to another aspect of the invention, there is provided bulk particulate material densification apparatus which includes a vessel to at least partially confine a body of a bulk particulate material, the vessel defining a bulk particulate material receiving or confining zone;

at least two elongate rotatable members which are transversely spaced and which are arranged such that at least one will be submerged in use by bulk particulate material in the bulk particulate material receiving or confining zone mechanically severely to agitate the bulk particulate material, the rotatable members each having an axis of rotation and including a plurality of axially spaced agitating formations which project outwardly away from their axes of rotation; and drive means connected to the rotatable members capable of rotating the rotatable members about their axes of rotation to agitate bulk particulate material in the bulk particulate material receiving zone.

Preferably, each rotatable member with agitating formations is arranged to be submerged in use by bulk particulate material in the bulk particulate material receiving zone.

Preferably, at least two of the elongate rotatable members are arranged one above the other. When at least two rotatable members are arranged one above the other, they may be configured to rotate in the same direction.

Preferably, at least two of the elongate rotatable members are arranged side by side. When at least two rotatable members are arranged side by side, they may be configured to rotate in opposite directions.

The vessel may define a free head space above the bulk particulate material receiving or confining zone.

The axes of rotation of the rotatable members are typically substantially parallel. The axes of rotation preferably extend sideways, e.g. substantially horizontal.

The apparatus typically includes an outlet or outlets for densified bulk particulate material at a low elevation and an inlet for bulk particulate material at a higher elevation than the outlet. The inlet may be above the rotatable members and the outlet or outlets may be below the rotatable members. Thus, the outlet or outlets may be a bottom outlet or bottom outlets.

In one embodiment of the invention, the inlet, outlet(s) and rotatable members are arranged in use to feed bulk particulate material being densified through the bulk particulate material receiving or confining zone in a direction which is transverse to the axes of rotation of the rotatable members.

The apparatus may include a densification agent inlet leading into the vessel.

The apparatus may include a densification agent outlet from the vessel to remove vaporized densification agent. Instead, the densification agent inlet may also function as a densification agent outlet.

The agitating formations may project radially away from the axes of rotation of the rotatable members. The rotatable members may thus include a core from which the agitating formations project and to which they are attached.

The agitating formations may individually comprise a shank or shaft portion and a head portion at an end of the shaft portion remote from the core. The head portion may advantageously be used to scrape clean internal surfaces of the vessel.

The agitating formations may be arranged in a plurality, e.g. four, axially extending but circumferentially spaced rows. The rows may be staggered so that an agitating formation in one row is flanked by empty positions in adjacent rows.

The drive means may be capable of rotating the rotatable members at an angular speed of between 100 rpm and 3500 rpm when the rotatable members are submerged in the body of particulate material. Typically, the drive means is capable of rotating the rotatable members at an angular speed of between 500 rpm and 1000 rpm when the rotatable members are submerged in the body of particulate material, e.g. at about 700 rpm to 800 rpm.

The apparatus may be configured for continuous operation in a continuous process.

The apparatus may include conveying means and bagging means, the conveying means being arranged to convey densified bulk particulate material from the vessel to the bagging means for bagging the densified bulk particulate material. Instead, the outlet for densified bulk particulate material may feed into bagging means.

The apparatus may include vibration means for vibrating the vessel to inhibit agglomeration or caking or build-up of the particulate material against interior surfaces of the vessel.

The apparatus may include dust extraction means for extracting dust from the vessel.

The rotatable members and interior surfaces of the vessel may be coated with a material which inhibits caking or agglomeration or build-up of the bulk particulate material against or on them.

The apparatus may include density measurement means and control means for controlling the bulk density of the densified bulk particulate material.

The invention will now be described, by way of example, with reference to the accompanying diagrammatic drawings.

In the drawings

Figure 1:
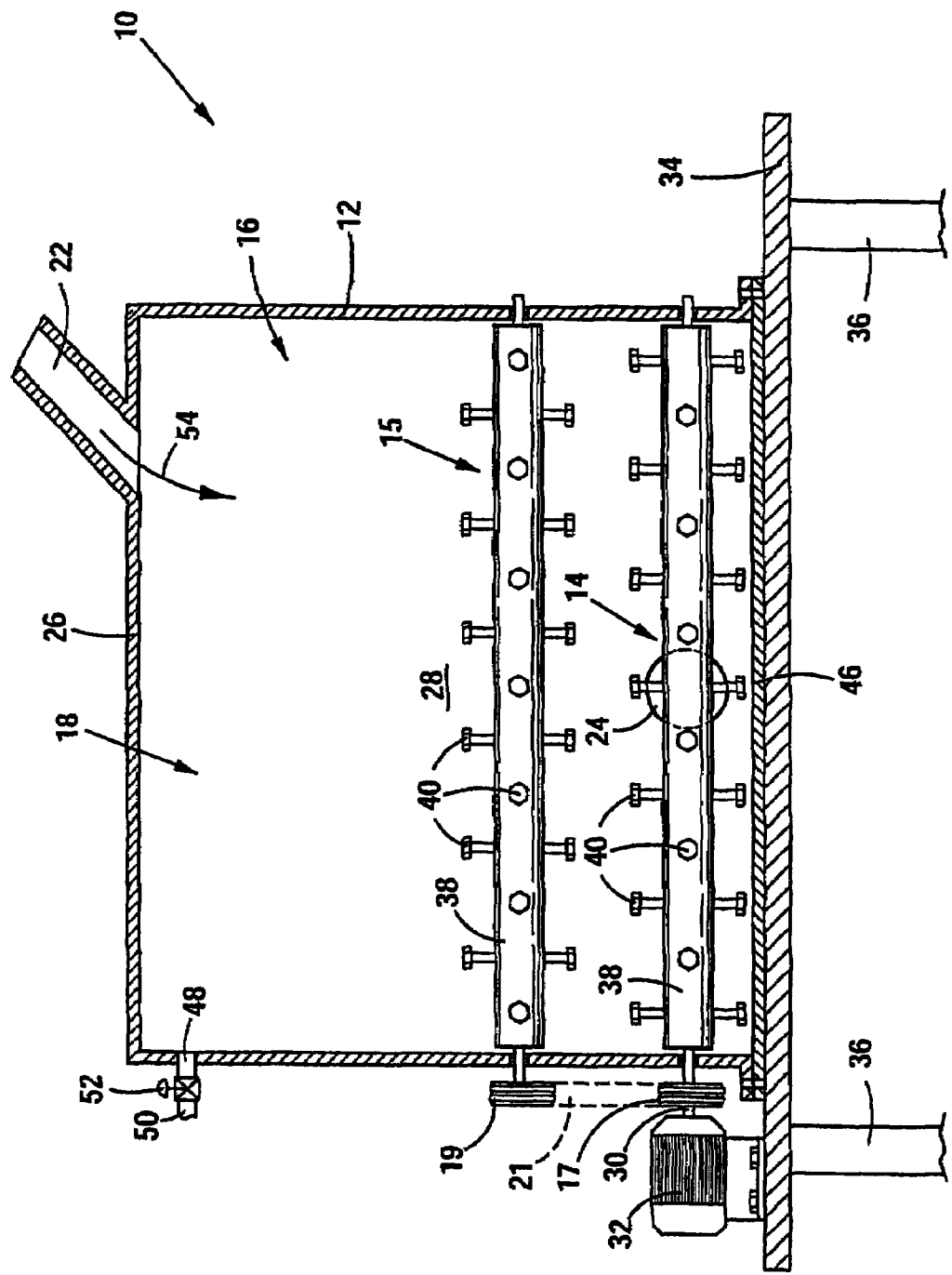
FIG. 1 shows a sectioned elevational view of one embodiment of densification apparatus in accordance with the invention for densifying a bulk particulate material.

Referring to FIG. 1 of the drawings, reference numeral 10 generally indicates one embodiment of densification apparatus in accordance with the invention for densifying a bulk particulate material. The apparatus 10 includes a vessel 12 for containing and confining the bulk particulate material, and transversely spaced elongate rotatable members 14, 15 which are in use submerged in the bulk particulate material contained in the vessel 12, and which are rotatable about horizontal longitudinally extending axes of rotation, which are parallel.

The vessel 12 is rectangular in plan, with the longer sides of the vessel 12 being parallel to the axes of rotation of the rotatable members 14, 15 and with the rotatable members 14, 15 extending through the shorter sides of the vessel 12. Bearings are provided for the rotatable members 14, 15.

The vessel 12 defines a bulk particulate material receiving or confining or densification zone 16 within which the rotatable members 14, 15 are located.

The vessel 12 includes an inlet 22 for feeding bulk particulate material into the vessel 12, and an outlet 24 to remove densified bulk particulate material from the vessel 12. The inlet 22 is located in a roof 26 of the vessel 12, and the outlet 24 is located in a wall 28 of the vessel 12 extending parallel to the axis of rotation of the rotatable member 14. In a more preferred embodiment, the outlet, or more than one outlet, is located in a floor 46 of the vessel 12.

The rotatable member 14 is located more or less at the elevation of the outlet 24. The rotatable member 14 is mechanically attached by means of a coupling 17 to a drive shaft 30, which is in turn drivingly connected to an electric motor 32. The electric motor 32 is capable of selectively rotating the rotatable member 14 at an angular speed of between 700 rpm and 800 rpm. The coupling 17 also functions as a pulley. By means of a pulley 19, a drive belt 21 and the coupling/pulley 17, the electric motor 32 can also drive the rotatable member 15.

The electric motor 32 and the vessel 12 are supported on a base 34 having legs 36.

The rotatable members 14, 15 each include a core 38 and a plurality of axially spaced, radially extending agitating formations 40. The agitating formations 40 of each rotatable member 14, 15 are arranged in four axially extending rows, only three rows of which are visible in FIGS. 1 and 2 of the drawings. The rows are equiangularly spaced from one another so that an angle of 90° exists between adjacent rows. The rows are also staggered so that an agitating formation 40 in one row is flanked by empty positions in adjacent rows, with agitating formations 40 of non-adjacent rows being diagonally aligned.

Figure 2:
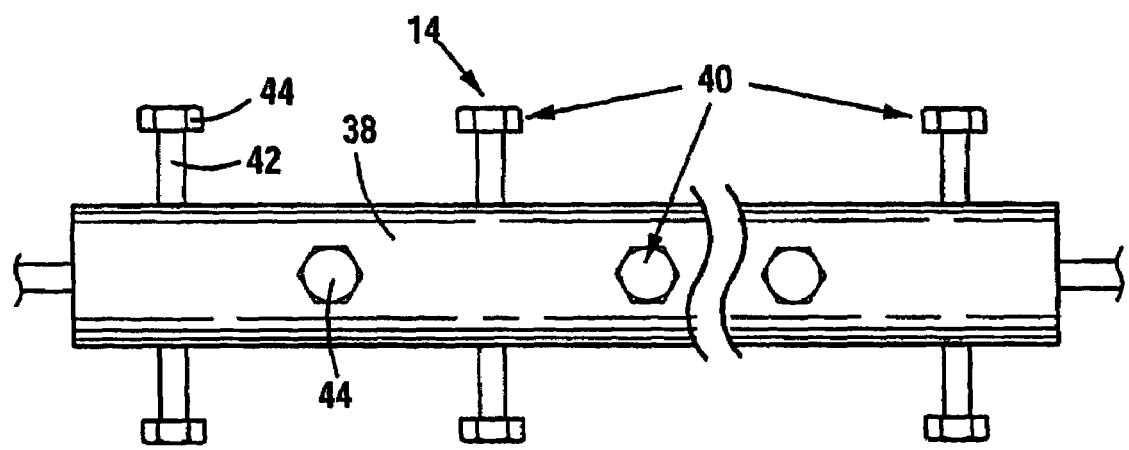
FIG. 2 shows an elevational side view of a rotatable member of the densification apparatus of FIG. 1.

Each agitating formation 40 comprises a shank portion 42 and a head portion 44 (see FIG. 2). In one embodiment of the invention, each agitating formation 40 is in the form of a bolt screwed into the core 38. However, it is to be appreciated that there are many other suitable embodiments of agitating formations.

The vessel 12 and the rotatable member 14 are dimensioned such that there is little clearance between the floor 46 and walls 28 of the vessel 12, on the one hand, and the head portions 44 of the agitating formations 40 when the rotatable member 14 is rotated, on the other hand. Similarly, there is little clearance between the head portions 44 of the agitating formations 40 of the rotatable member 15 and the walls 28 of the vessel 12. Accordingly, the head portions 44 act during rotation of the rotatable members 14, 15 as scrapers to inhibit caking of the bulk particulate material on interior surfaces of the vessel 12, in addition to agitating the bulk particulate material.

A densification agent inlet 48 is provided in a wall of the vessel 12, at a relatively high elevation. The inlet 48 is in flow communication with a water feed line 50. A flow controller 52 is provided in the flow line 50.

If desired, a dust extraction outlet (not shown) may be provided for the vessel 12, and a vibrator (not shown), may be mounted against an exterior surface of the vessel 12.

In use, the vessel 12 is fed on a controlled and measured basis with bulk particulate material, as shown by arrow 54, continuously to fill the vessel 12 thereby to cover the rotatable members 14, 15. Water as densification agent is added in a predetermined controlled ratio through the inlet 48 to the bulk particulate material. When the bulk particulate material is silica fume, this ratio is about 6:100 on a mass basis. However, it is to be appreciated that the apparatus 10 can also function without the use of a densification agent, such as water.

In order to densify the bulk particulate material, the submerged rotatable members 14, 15 are rotated at an angular speed of about 732 rpm by means of the electric motor 32. The agitating formations 40 severely agitate the bulk particulate material thereby densifying the bulk particulate material. During agitation, the bulk particulate material is flung against the sides of the vessel 12. The rotatable members 14, 15 however do not fluidise the body of bulk particulate material inside the vessel 12 to any significant extent, nor are cylindrical cavities formed co-axial with the rotatable members 14, 15.

If a vibrator is present, the vibrator is run to inhibit caking of the bulk particulate material against the interior surfaces of the vessel 12, and dust which is formed is extracted through the dust extraction outlet (if present), together with water vapour formed as a result of the frictional heating of the particulate material, which can reach temperatures of 70° C. to 80° C. If a separate densification agent outlet is not provided, the bulk particulate material inlet 22 can serve to remove water vapour from the vessel 12.

The densified bulk particulate material is discharged through the outlet 24. Discharging is effected by the rotation of the rotatable member 14. The density of the densified bulk particulate material discharged from the vessel 12 is measured by density measurement and control means (not shown), which increases or decreases the discharge rate of the densified bulk particulate material from the vessel 12 by opening or closing the outlet 24, thereby increasing or decreasing the residence time of the bulk particulate material in the vessel 12, in order to densify the bulk particulate material to a desired bulk density. Typically, the densified bulk particulate material includes less than 1% by mass water and is thus essentially dry.

Figure 3:
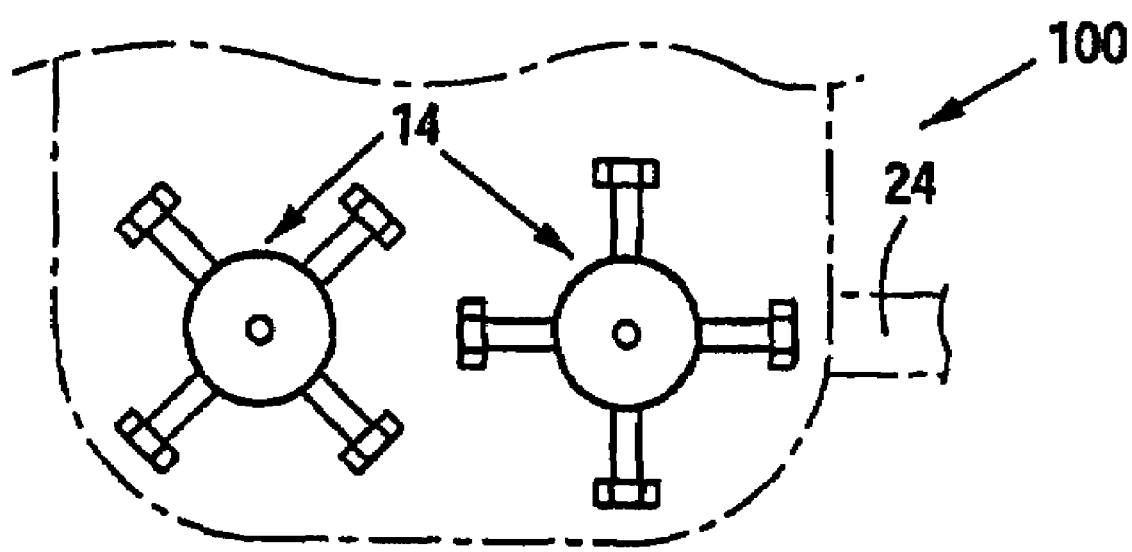
FIGS. 3, 4 and 5 show schematically other arrangements of rotatable members of densification apparatus in accordance with the invention for densifying a bulk particulate material.
Figure 4:
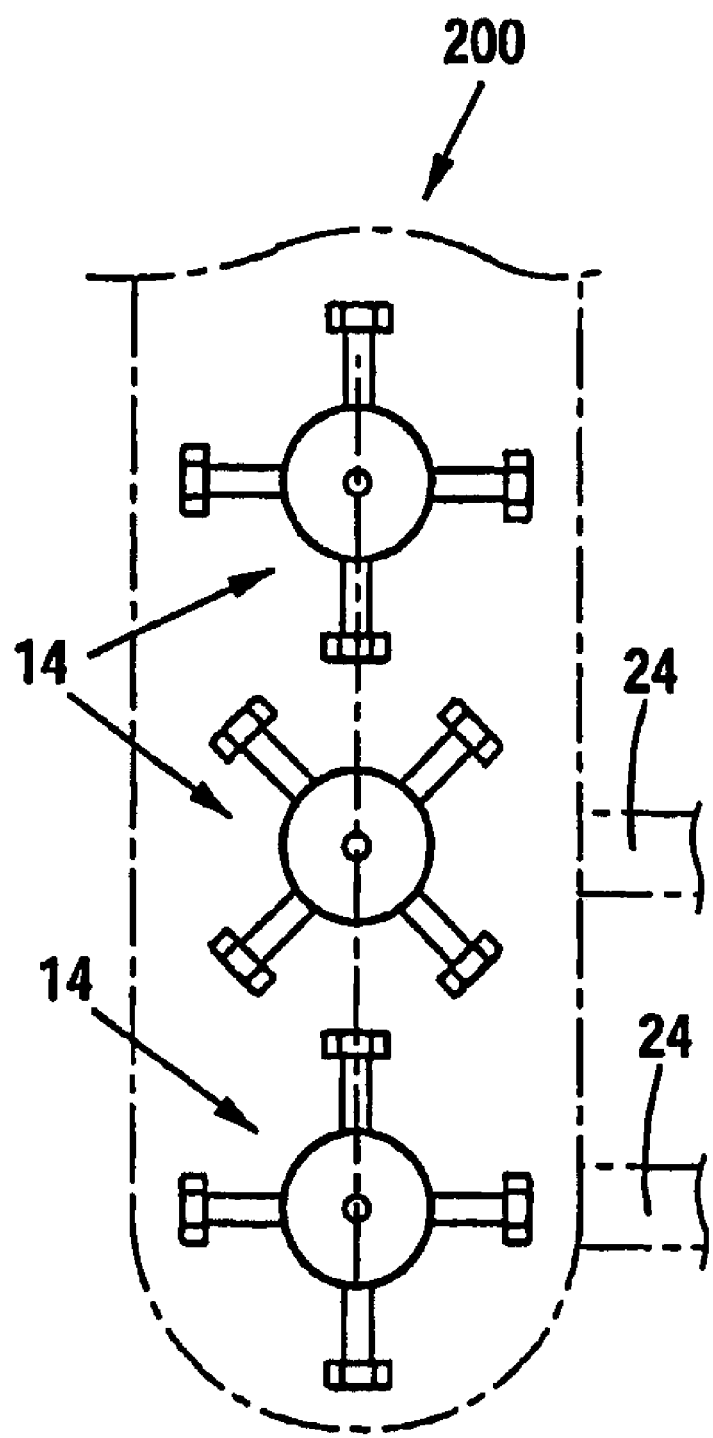
Figure 5:
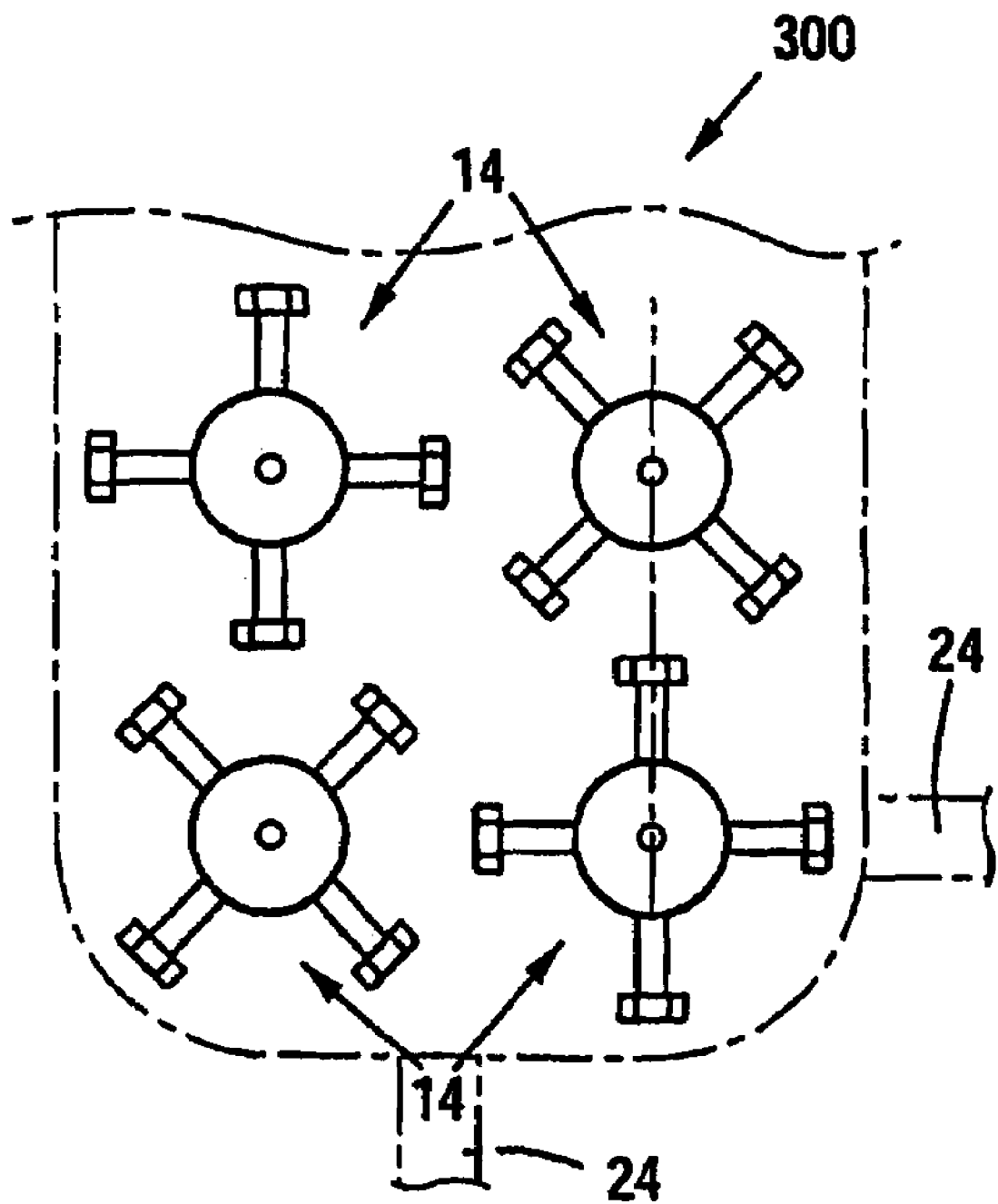

Referring to FIGS. 3 to 5 of the drawings, other embodiments of densification apparatus in accordance with the invention for densifying a bulk particulate material are generally indicated by reference numerals 100, 200 and 300. As can be seen from the simplified schematic diagrams shown in FIGS. 3 to 5, various other arrangements of rotatable members are possible. In the apparatus 100, two rotatable members 14 at the same elevation are used. The rotatable members 14 may rotate towards each other, or away from each other, or in the same direction (not preferred). In FIG. 4, it is shown that more than two, e.g. three, rotatable members may be used in a vertical arrangement, and that more than one outlet 24 may be employed. FIG. 5 illustrates how a plurality, e.g. four, rotatable members 14 are arranged in a matrix, and that a bottom outlet 24 (preferred) may be employed.

When a plurality of vertically spaced rotatable members are used, rotatable members at a higher elevation can be used to shape or reshape and reduce in size particles of the particulate material (e.g. alumina or bauxite), with rotatable members at a lower elevation contributing more to the densification of the bulk particulate material. In such an arrangement, the speed of the rotatable members at various elevations may be different.

It is an advantage of the invention, as illustrated, that it provides a cost effective method and apparatus for densifying a bulk particulate material, such as silica fume. It is a further advantage of the invention, as illustrated, that the method and apparatus are capable of densifying material such as silica fume to a higher bulk density than conventional pneumatic (or other) methods and apparatus used for the densifying of silica fume and like materials. Particle agglomeration is also much less compared to the prior art pneumatic densification processes of which the Applicant is aware, thus providing smaller average particle sizes, and increased BET surface areas. The apparatus 10, as illustrated, advantageously also lends itself to continuous processes.

The invention claimed is:

1. A method of densifying a bulk particulate material, the method including
at least partially confining the bulk particulate material; and
mechanically severely agitating the confined bulk particulate material without significantly fluidising the bulk particulate material and without causing any stable cavities in the bulk particulate material, the agitation being with at least two elongate rotatable members submerged in the confined bulk particulate material, to provide a smaller average particle size and increased BET surface area, the rotatable members each having an axis of rotation and including a plurality of axially spaced agitating formations which project outwardly away from their axes of rotation, and the rotatable members being transversely spaced and arranged one above the other, thereby to densify the bulk particulate material.

2. The method as claimed in claim 1, which includes feeding the bulk particulate material being densified in a direction which is transverse to the axes of rotation of the rotatable members, past the rotatable members, and which includes removing a flowable densified bulk particulate material from the vessel.

3. The method as claimed in claim 1, in which at the least two rotatable members arranged one above the other are rotated in the same direction.

4. The method as claimed in claim 1, in which at least two rotatable members are arranged side by side.

5. The method as claimed in claim 4, in which the at least two rotatable members arranged side by side are rotated in opposite directions.

6. The method as claimed in claim 1, in which a vertical bulk density gradient is established in the confined bulk particulate material, with the highest bulk density being at the bottom.

7. The method as claimed in claim 1, in which rotatable members at various elevations are rotated at different speeds.

8. The method as claimed in claim 1, in which the axes of rotation of the rotatable members are substantially parallel and in which the axes of rotation are substantially horizontal.

9. The method as claimed in claim 1, in which a bulk particulate feed material is densified on a continuous basis, with the bulk particulate feed material being fed from above the rotatable members and with densified bulk particulate material being removed from below the rotatable members.

10. The method as claimed in claim 1, in which the mechanical agitation of the bulk particulate material is effected in the presence of a densification agent.

11. The method as claimed in claim 10, in which the densification agent is an aqueous fluid.

12. The method as claimed in claim 10, in which an average concentration of the densification agent in the densified bulk particulate material is less than the average concentration of the densification agent in the bulk particulate material being densified.

13. The method as claimed in claim 10, in which the bulk particulate material is allowed to heat up during the mechanical agitation, with at least a portion of the densification agent vaporizing and being removed from the bulk particulate material being densified or from the densified bulk particulate material.

* * * * *